United States Patent
Ajiki et al.

(10) Patent No.: US 7,316,289 B2
(45) Date of Patent: Jan. 8, 2008

(54) ELECTRO-ACOUSTIC TRANSDUCER AND METHOD OF MANUFACTURING TRANSDUCER

(75) Inventors: Kenichi Ajiki, Matsusaka (JP); Kimihiro Ando, Tsu (JP); Masashi Kawabe, Ise (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 258 days.

(21) Appl. No.: 10/499,189

(22) PCT Filed: Oct. 9, 2003

(86) PCT No.: PCT/JP03/12951

§ 371 (c)(1),
(2), (4) Date: Jun. 17, 2004

(87) PCT Pub. No.: WO2004/039125

PCT Pub. Date: May 6, 2004

(65) Prior Publication Data

US 2005/0018869 A1    Jan. 27, 2005

(30) Foreign Application Priority Data

Oct. 25, 2002    (JP) ............................ 2002-310761

(51) Int. Cl.
*H04R 1/02* (2006.01)

(52) U.S. Cl. ............... 181/171; 181/166; 181/172; 381/190; 381/191; 381/396; 381/400; 381/403; 381/404; 381/405; 381/420

(58) Field of Classification Search ........... 181/171, 181/166, 172; 381/190, 191, 396, 400, 403, 381/404, 405, 420
See application file for complete search history.

(56) References Cited

U.S. PATENT DOCUMENTS

| | | | | |
|---|---|---|---|---|
| 5,528,697 | A | * | 6/1996 | Saito .......................... 381/396 |
| 6,151,486 | A | * | 11/2000 | Holshouser et al. ..... 455/575.3 |
| 6,377,145 | B1 | * | 4/2002 | Kumagai .................... 335/274 |
| 6,570,993 | B1 | * | 5/2003 | Fukuyama .................. 381/396 |

(Continued)

FOREIGN PATENT DOCUMENTS

JP    2000-153231    * 11/1998

(Continued)

OTHER PUBLICATIONS

International Search Report for application No. PCT/JP03/12951 dated Jan. 20, 2004.

*Primary Examiner*—Lincoln Donovan
*Assistant Examiner*—Forrest Phillips
(74) *Attorney, Agent, or Firm*—RatnerPrestia

(57) ABSTRACT

An electro-acoustic transducer includes a tone generator, a vibrator, and a case. The tone generator includes a diaphragm, and a voice coil joined to the diaphragm. The vibrator includes a magnetic circuit having a magnetic gap at which the voice coil is positioned, and a suspension made of metal and having a first end joined to the magnetic circuit to suspend the magnetic circuit for allowing the magnetic circuit to vibrate. The case is joined to a periphery of the diaphragm, and includes a metal plate joined to a second end of the suspension. The metal plate is joined to the suspensions reliably, hence allowing the electro-acoustic transducer to be manufactured stably.

9 Claims, 4 Drawing Sheets

U.S. PATENT DOCUMENTS

| | | | |
|---|---|---|---|
| 6,672,423 B2 * | 1/2004 | Kato | 181/161 |
| 6,724,908 B2 * | 4/2004 | Fukuyama | 381/396 |
| 6,728,386 B1 | 4/2004 | Andersen | |
| 7,010,140 B2 * | 3/2006 | Furuya | 381/396 |
| 2002/0017423 A1 * | 2/2002 | Kato | 181/161 |
| 2002/0034313 A1 | 3/2002 | Lin et al. | |

FOREIGN PATENT DOCUMENTS

| | | |
|---|---|---|
| JP | 11-007285 A | 1/1999 |
| JP | 2000-153231 | 6/2000 |
| JP | 2001-016686 | 1/2001 |
| JP | 2001-104881 A | 4/2001 |
| JP | 2001-300422 A | 10/2001 |
| TW | 453090 | 9/2001 |
| TW | 488179 | 5/2002 |

* cited by examiner

ELECTRO-ACOUSTIC TRANSDUCER AND METHOD OF MANUFACTURING TRANSDUCER THIS APPLICATION IS A U.S. NATIONAL PHASE APPLICATION OF PCT INTERNATIONAL APPLICATION PCT/JP03/012951.

TECHNICAL FIELD

The present invention relates to an electro-acoustic transducer used in portable communication devices, such as portable telephones, to generate ringing tone and vibration for incoming calls, and a method of manufacturing the transducer.

BACKGROUND OF THE INVENTION

FIG. 4 is a cross-sectional view of a conventional electro-acoustic transducer disclosed in Japanese Patent Laid-Open Publication No. 2000-153231. FIG. 5 is an enlarged cross-sectional view of the transducer.

Diaphragm 1 is joined to frame 2 having a resin-molded periphery. An end of voice coil 3 is bonded to diaphragm 1. Upper plate 6 is bonded on magnet 5 bonded on yoke 4. Magnetic circuit 7 includes yoke 4, magnet 5, and upper plate 6. The other end of voice coil 3 is positioned untouched at magnetic gap 8 between yoke 4 and upper plate 6. Respective ends of suspensions 9a and 9b mounted on top and bottom surfaces of yoke 4, respectively are joined and suspended to frame 2. Suspension 9a and 9b are incorporated with resin caps 9c provided at respective ends thereof by outsert molding. Resin caps 9c are bonded to frame 2 and join suspensions 9a and 9b to frame 2. Yoke 4 and suspensions 9a and 9b are joined together by laser welding. Cover 2a is joined to frame 2 and covers an outer periphery of yoke 4.

An operation of the conventional electro-mechanical acoustic-transducer will be described. A signal is input to voice coil 3. If a frequency of the input signal matches a mechanical resonance frequency of a vibrator composed of suspensions 9a, 9b and magnetic circuit 7, magnetic circuit 7 resonates and vibrates up and down intensely, thus causing a user of a portable communication device including the electro-acoustic transducer to feel the vibration. If the frequency of the input signal matches a mechanical resonance frequency of a tone generator composed of diaphragm 1 and voice coil 3, diaphragm 1 resonates and vibrates up and down intensely, causing the user of the portable communication device to notice the vibration with sound.

The resonance frequency of magnetic circuit 7 may be set to approximately 100 Hz, and the resonance frequency of the tone generator may be set to approximately 1 kHz. The frequency of the input signal is selected, and the electro-acoustic transducer allows the user to feel the vibration by contact and to notice the vibration by tone.

If the frequency of the input signal matches the resonance frequency of magnetic circuit 7, magnetic circuit 7 resonates and vibrates intensely. However, vibration of diaphragm 1 that is generated as a reaction of the vibration of magnetic circuit 7 does not have a frequency high enough to enable users to notice the vibration by sound.

If the frequency of the input signal matches a mechanical resonance frequency of the tone generator composed of diaphragm 1 and voice coil 3, diaphragm 1 resonates and vibrates intensely, enabling the user to notice the vibration with sound. However, since magnetic circuit 7 does not follow the frequency of the input signal which is high due to a large mass of magnetic circuit 7, the vibration of magnetic circuit 7 that is generated as a reaction of the vibration of diaphragm 1 cannot have a large amplitude.

In the conventional electro-acoustic transducer, a surface of yoke 4 is provided with Ni plating and Sn plating to secure enough joinitng strength in vibrating components. Suspension 9a and 9b are welded to join to yoke 4 by laser beam. The production process, therefore, is under complicated controls to restrain possible fluctuations of the jointing strength due to fluctuations of the thickness of the metal plating or intensity of the laser beam.

SUMMARY OF THE INVENTION

An electro-acoustic transducer includes a tone generator, a vibrator, and a case. The tone generator includes a diaphragm, and a voice coil joined to the diaphragm. The vibrator includes a magnetic circuit having a magnetic gap at which the voice coil is positioned, and a suspension made of metal and having a first end joined to the magnetic circuit to suspend the magnetic circuit for allowing the magnetic circuit to vibrate. The case is joined to a periphery of the diaphragm, and includes a metal plate joined to a second end of the suspension.

The metal plate is joined to the suspensions reliably, hence allowing the electro-acoustic transducer to be manufactured stably.

DETAILED DESCRIPTION OF THE PREFERRED EMBODIMENT

Figure 1:
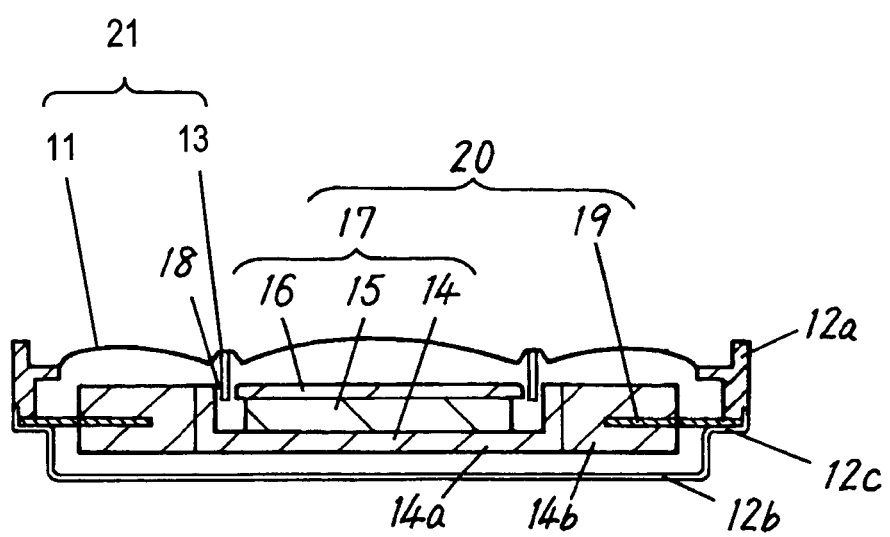
FIG. 1 is a cross-sectional view of an electro-acoustic transducer acording to an exemplary embodiment of the present invention.
Figure 2:
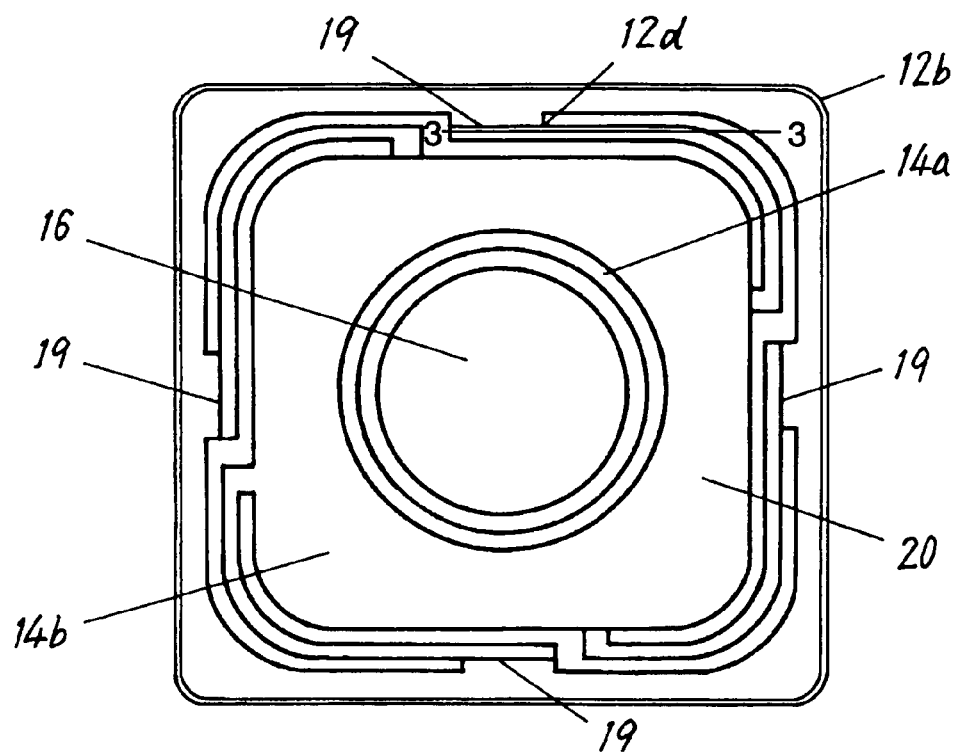
FIG. 2 is an exploded plan view of the electro-acoustic transducer according to the embodiment.
Figure 3A:
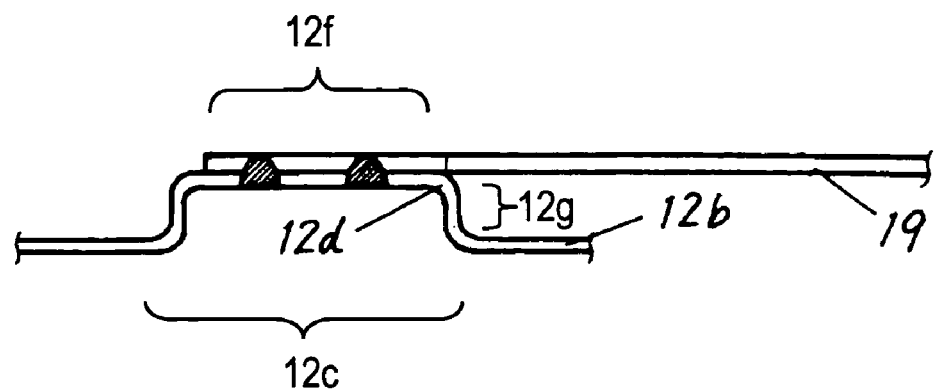
FIG. 3A is a cross-sectional view of the electro-acoustic transducer at line 3-3 in FIG. 2 according to the embodiment.

FIG. 1 is a cross-sectional view of an electro-acoustic transducer according to an exemplary embodiment of the present invention. FIG. 2 is an exploded plan view of the electro-acoustic transducer. FIG. 3A is a cross-sectional view of the electro-acoustic transducer at line 3-3 in FIG. 2. Diaphragm 11 is joined to first case 12a having a resin-molded periphery. An end of voice coil 13 is bonded to diaphragm 11. Plate 16 is bonded on magnet 15 bonded on a yoke 14. Magnetic circuit 17 is composed of yoke 14, magnet 15 and plate 16. The other end of voice coil 13 is positioned untouched at magnetic gap 18 between yoke 14 and plate 16. Yoke 14 includes yoke body 14a of magnetic materials and weight 14b having a large specific gravity on the periphery of yoke body 14a. Weight 14b is made of molded resin mixed with tungsten powder, provided. At the molding, an end of suspension 19 made of stainless steel sheet is incorporated in weight 14b by outsert molding.

Vibrator 20 is composed of yoke 14 and suspension 19. The other end of suspensions 19 is welded on second case 12b made of stainless steel sheet by YAG laser to suspend vibrator 20 movable up and down.

Case 12b is mounted to case 12a, thus providing the electro-acoustic transducer of the embodiment.

An operation of the electro-acoustic transducer of the embodiment will be described.

A signal is input to voice coil 3. If the frequency of the input signal matches a mechanical resonance frequency of the vibrator 20 composed of suspension 19 and magnetic circuit 17, magnetic circuit 17 vibrates up and down intensely. A user of a portable communication device including the electro-acoustic transducer feels the vibration (for example, at 130 kHz) by contact. If the input signal has a voice frequency ranging about from 500 Hz to 10 kHz, diaphragm 11 vibrates back and forth, causing the user to perceive the vibration by sound.

The resonance frequency of vibrator 20 including magnetic circuit 17 may be set to approximately 100 Hz, and the resonance frequency of tone generator 21 may be set to approximately 1 kHz. Therefore, the frequency of the input signal input to the electro-acoustic transducer is selected, and the user can perceive the vibration by contact or by sound.

If the frequency of the input signal matches the resonance frequency of vibrator 20, magnetic circuit 17 resonates and vibrates back and forth intensely. However, the vibration of diaphragm 11 that is generated as reaction of the vibration of magnetic circuit 17 does not have a frequency high enough to notice the user of the vibration by sound.

If the frequency of the input signal matches the resonance frequency of tone generator 21 composed of diaphragm 11 and voice coil 13, diaphragm 11 resonates and vibrates back and forth intensely, causing the user to notice of the vibration by sound. The sound is typically used as a ringing tone for incoming calls. However, since magnetic circuit 17 cannot follow the frequency of the input signal, which is high, due to a large mass of magnetic circuit 17, the vibration of magnetic circuit 17 that is generated as reaction of the vibration of diaphragm 1 cannot have a large amplitude.

In the electro-acoustic transducer of the embodiment, tone generator 21 has a resonance frequency of approximately 1 kHz, and the sound having the frequency is used as a ringing tone for incoming calls. Instead, when a melody is required for incoming calls, an input signal having a frequency corresponding to the melody is applied to voice coil 13, hence allowing diaphragm 11 to produce the melody. In this case, tone generator 21 may have is a flat frequency characteristic in an audible frequency range, for instance, from 500 Hz to 10 kHz, so that the resonant frequency is not emphasized.

Figure 3B:
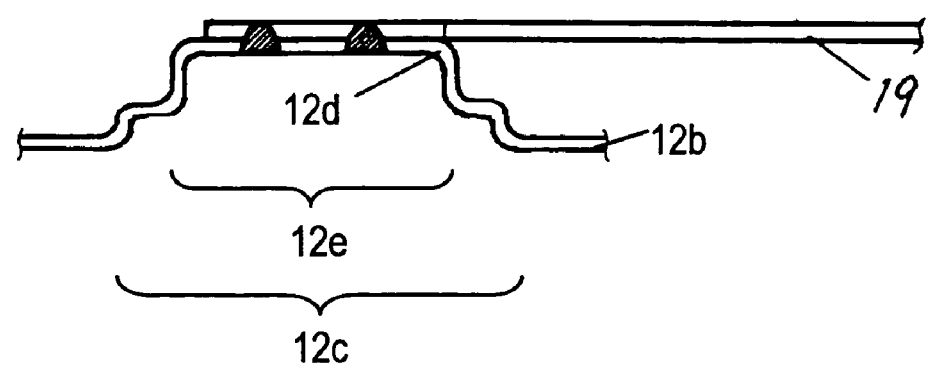
FIG. 3B is a cross-sectional view of another electro-acoustic transducer at line 3-3 in FIG. 2 according to the embodiment.
Figure 4:
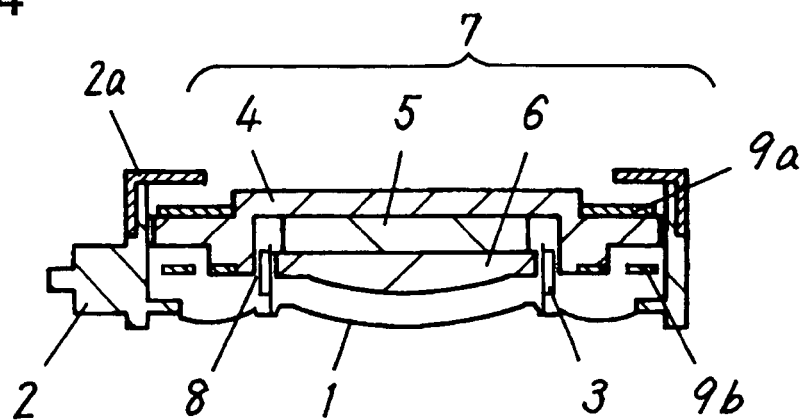
FIG. 4 is a cross-sectional view of a conventional electro-mechanical acoustic transducer.

A method of welding second case 12b on suspension 19 with YAG laser will be explained in detail. Case 12b is provided with shoulder 12c by draw forming, as shown in FIG. 3A. The other end of suspension 19 is positioned on flat portion 12f of shoulder 12c, and then, is welded from above the suspension by the laser. Flat portion 12f of shoulder 12c communicates with a side wall of second case 12b via connection 12g. If shoulder 12c does not have an area enough for the welding as a welding region, shoulder 12c may be further processed to be provided with pedestal 12e as the welding region by draw forming at least adjacent only to suspension 19, as shown in FIG. 3B. This structure allows suspension 19 to be positioned on the welding region of shoulder 12c easily. The intensity of the laser may be determined so that a weld mark is visible from the backside surface, and the weld mark allows the welding to be judged in acceptance or defect. The size and position of pedestal 12e formed by draw forming may be determined arbitrary. That is, the region enable for the welding may be determined easily.

Corner 12d having a small radius of curvature may be adopted as a fulcrum of suspension 19 vibrating. The corner stabilizes the back and forth vibration of the suspension as well as the vibration characteristic, i.e., the resonance frequency of mechanical vibration.

The welding with YAG laser can limit a welded area and can reduce thermal influence to adjacent areas. That is, the method is suitable for welding small electronic components. Welding methods with laser other than the YAG laser also limit the region. Suspension 19 and second case 12b are made of stainless steel sheet. The intensity of the laser is determined so that a weld mark is visible from the backside surface. The weld mark allows the welding to be judge in acceptance or defect, as described above. The judging with the weld mark can be adopted also in judging weld quality of components made of metal sheet. The method of judging accomplishes a reliable welding for metal sheets used in components and to produce devices including the components without any troublesomeness.

The corner of shoulder 12c tends to have an inner wall having an arc shape. Corner 12d preferably has an arc shape having a small radius of curvature. If the radius of curvature of corner 12d changes by not less than 1.0 mm during back and forth movements of suspension 19, the mechanical resonance frequency changes. This change prevents the position of the welding region from being determined easily for provide a predetermined resonance frequency.

The radius of curvature of corner 12d preferably is not more than 1.0 mm, and more preferably, is not more than 0.8 mm to provide a morestable vibration property. Corner 12d of shoulder 12c formed by the draw forming may not have a predetermined radius of curvature depending on material of second case 12b. In this case, a sheet made of material included commonly in case 12b and suspension 19 may be placed between shoulder 12b and suspension 19 during the welding, thereby allowing corner 12d not to have the predetermined radius of curvature in shoulder 12c.

The welding is carried out with YAG laser according to the embodiment. Laser other than the YAG laser, such as laser diode, may be employed to carry out the welding as long as the weld mark is visible from the back side of the weld region.

Figure 5:
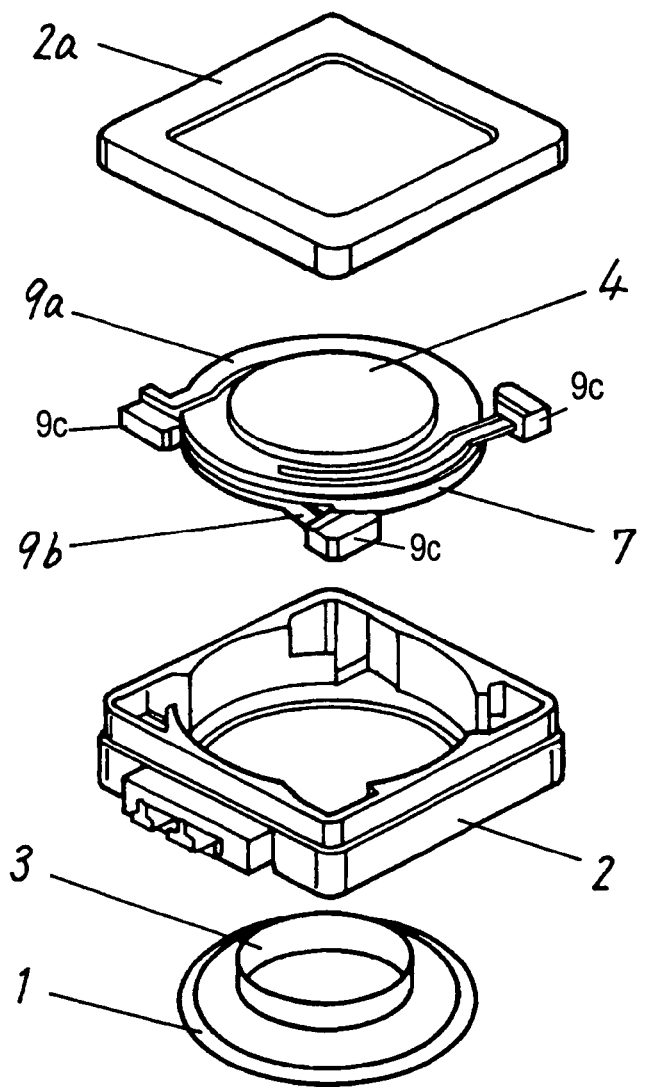
FIG. 5 is an exploded perspective view of the conventional electro-mechanical acoustic transducer.

The electro-acoustic transducer of the embodiment includes a single kind of suspension 19, but may include two kinds of suspensions having different heights joined to yoke 14 similarly to a conventional electro-acoustic transducer shown in FIG. 5. In this case, the two kinds of suspensions are joined to two shoulders having different heights, respectively.

INDUSTRIAL APPLICABILITY

An electro-acoustic transducer according to the present invention includes a suspension and a case made of metal sheet. The suspension and the case are joined stably, thus allowing transducer to be manufactured at a high productivity.

The invention claimed is:
1. An electro-acoustic transducer comprising:
a tone generator including
a diaphragm, and
a voice coil joined to the diaphragm;

a vibrator including
a magnetic circuit having a magnetic gap at which the voice coil is positioned,
a suspension made of metal and having a first end joined to the magnetic circuit to suspend the magnetic circuit for allowing the magnetic circuit to vibrate; and
a case joined to a periphery of the diaphragm, the case including a metal plate joined to a second end of the suspension;
wherein the case includes
a first case joined to the periphery of the diaphragm, and
a second case mounted to the first case and having the metal plate,
wherein the second end of the suspension and the metal plate are joined together by laser welding,
wherein the metal plate of the case includes a shoulder facing inside of the case,
wherein the second end of the suspension is joined to the shoulder, and
wherein the shoulder has a corner closer to an inside of the case than a position at which the second end of the suspension is joined to the shoulder, the corner of the shoulder having a radius of curvature.

2. The electro-acoustic transducer of claim 1,
wherein the shoulder includes
a flat portion parallel to the suspension, being joined to the suspension, and
a joint joining the flat portion and the case, the joint extending from a joined region of the flat portion at which the flat portion is joined to the suspension, the joint extending in a direction in which the suspension extends, and
wherein a corner provided between the flat portion and the joint having a radius of curvature less than 1.0 mm.

3. The electro-acoustic transducer of claim 1, wherein the shoulder includes a pedestal facing inside of the case and joined to the second end of the suspension.

4. A method of manufacturing an electro-acoustic transducer, said method comprising:
joining a diaphragm and a voice coil;
joining a magnetic circuit and a first end of a suspension made of metal, the magnetic circuit having a magnetic gap;
placing a shoulder of a metal plate of a case in direct contact with a second end of the suspension;
welding the shoulder of the metal plate of the case to the second end of the suspension by radiating laser onto one of the shoulder of the metal plate and the second end of the suspension;
observing a weld mark produced by said welding of the metal plate from other of the shoulder of the metal plate and the second end of the suspension;
quitting said welding of the metal plate according to a status of the observed weld mark; and
joining the case and the periphery of the diaphragm by positioning the voice coil in the magnetic gap.

5. The method of claim 4,
wherein the case includes a first case and a second case including the metal plate, and
wherein said joining of the case to the periphery of the diaphragm includes joining the first case to the periphery of the diaphragm,
said method further comprising
jointing the first case to the second case.

6. The electro-acoustic transducer of claim 1, wherein the metal plate has a first surface and a second surface opposite to the second surface, the first surface facing inside of the case, the second surface facing outside of the case, the first surface of the metal plate being coupled to the suspension, said electro-acoustic transducer further comprising a weld mark produced by the welding, the weld mark being visible from the second surface of the metal plate.

7. The method of claim 4, wherein
the shoulder of the metal plate has a first surface and a second surface opposite to the first surface of the metal plate,
said welding the shoulder of the metal plate comprises welding the second end of the suspension to the first surface of the shoulder of the metal plate, and
said observing the weld mark comprises observing the weld mark from the second surface of the shoulder of the metal plate.

8. The electro-acoustic transducer of claim 1, wherein the shoulder is formed by draw forming.

9. The method of claim 4, further comprising forming the shoulder of the metal plate of the case by draw forming.

* * * * *